United States Patent [19]
Bloomfield et al.

[11] Patent Number: 5,412,776
[45] Date of Patent: May 2, 1995

[54] METHOD OF GENERATING A HIERARCHICAL WINDOW LIST IN A GRAPHICAL USER INTERFACE

[75] Inventors: Marc A. Bloomfield, Lighthouse Point, Fla.; Christopher A. H. Andrew, Orem, Utah

[73] Assignee: International Business Machines Corporation, Armonk, N.Y.

[21] Appl. No.: 996,223

[22] Filed: Dec. 23, 1992

[51] Int. Cl.⁶ ................................................. G06F 3/14
[52] U.S. Cl. .................................... 395/160; 395/159; 364/DIG. 2
[58] Field of Search .................. 364/DIG. 1, DIG. 2; 395/160, 159

[56] References Cited

U.S. PATENT DOCUMENTS

4,890,257  12/1989  Anthias et al. ........................ 364/900
5,065,347  11/1991  Pajak et al. ............................ 395/160

OTHER PUBLICATIONS

Mastering WordPerfect 5.1 & 5.2 for Windows, Alan Simpson pp. 59, 416–417, 1070, 1060.

*Primary Examiner*—Thomas G. Black
*Assistant Examiner*—Jean R. Homere
*Attorney, Agent, or Firm*—Bruce D. Jobse; Andrew J. Dillon

[57] ABSTRACT

Disclosed is a method of accessing at least a first of a plurality of object owned windows simultaneously open in a graphic user interface on a computer system. For each object on a computer system, an object list is maintained. The object list includes all opened windows owned by the objects. User inputs to the computer system are monitored for a user request for a window list. Responsive to a user request for the window list, each object list is retrieved and, for objects lists having a single opened window, a window entry to the window list is listed. For object lists having a plurality of opened windows, an object entry and a plurality of window entries are added to the window list. The window list is then displayed. Window names include an owning object identifier and a description of the window. Adding a object entry and a plurality of window entries to a window list includes making the name of the object an entry and includes generating a plurality of entries for windows including descriptions of the windows. The window descriptions are placed proximate to but separate from the object name upon display of the window list.

4 Claims, 11 Drawing Sheets

METHOD OF GENERATING A HIERARCHICAL WINDOW LIST IN A GRAPHICAL USER INTERFACE

BACKGROUND OF THE INVENTION

CROSS-REFERENCE TO RELATED APPLICATIONS

The present patent application is one of a group of copending applications which concern the same overall personal computer system but which individually claim different inventive concepts embodied in such personal computer system. These related patent applications are specifically incorporated by reference herein, and are more particularly described as follows:

(1) Application Ser. No. 07/854,171, still pending entitled "Method for Providing Conditional Cascading in a Computer System", the inventors being Bloomfield et al;

(2) Application Ser. No. 07/854,257, still pending entitled "Method for Providing Size Adjustment for a Maximized Window in a Computer System Graphical User Interface", the inventor being Bloomfield;

(3) Application Ser. No. 07/855,369, now U.S. Pat. No. 5,371,844 entitled "Palette Manager In A Graphical User Interface Computer System", the inventors being Bloomfield et al.;

(4) Application Ser. No. 996,983, now U.S. Pat. No. 5,345,550 entitled "User-Modifiable Popup Menus For Object Oriented Behavior", the inventor being Bloomfield;

(5) Application Ser. No. 996,422, now abandoned entitled "Method Of Transferring Programs From Action Oriented GUI Paradigm To Object Oriented GUI Paradigm", the inventor being Bloomfield.;

(6) Application Ser. No. 08/263,906, still pending entitled "Apparatus And Method For Manipulating An Object In A Computer System Graphical User Interface", the inventors being Bloomfield et al.; and (7) Application Ser. No. 07/855,366, now abandoned entitled "Method For Providing A Readily Distinguishable Template And Means Of Duplication Thereof In A Computer System Graphical User Interface" filed 20 Mar. 1992, the inventors being Bloomfield et al.

TECHNICAL FIELD

This invention relates to personal computer systems and in particular to a method and device for improving a graphical user interface (GUI) on a personal computer system.

DESCRIPTION OF THE RELATED ART

Personal computer systems in general and IBM personal computers in particular have attained widespread use in contemporary society. Personal computer systems can usually be defined as a desktop, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95. Beginning with the earliest peronal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes, small memory size (12 Kbyte) and reasonable performance. DOS served well for the Family I machines and even into the basic Family II models, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufactures have investigated and used other types of GUI systems. One of the earliest in the personal computing area was Xerox's STAR system that presented the user with icons representing a particular operation or software application. Later, APPLE's Macintosh system added features such as windows and drag and drop to further the intuitive nature of the graphical user interface for APPLE's line of computers. Presently, MICROSOFT's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such as icons, which are graphical representations of various modules such as disk drives, applications and documents, or windows, which are rectangular areas on the screen in which applications or documents can be viewed, may be manipulated using the mouse. In this way, the underlying devices which the elements represent may be controlled.

As GUI systems developed, producing the underlying elements such as windows and icons has become well known. In fact, publicly available tools such as icon and window editors are now available to actually create the visual display. For example, Conklin, OS/2 Notebook, (Microsoft Press, 1990) pp. 159–255 discusses OS/2 software tools.

A relatively recent advance in the computer arts allows a user to simultaneously represent access, display and manipulate data from a variety of related and/or unrelated objects. One application may be simultaneously active on several objects. Activity relating to each object is generally displayed in a viewport or "window". These windows may overlap and partially or completely obscure each other and the data therein, or may be presented in a visually discreet, i.e. non-overlapping manner. As more and more windows are opened clutter increases.

Recently, a method for navigating between visually obscured data among multiple windows has been provided by selectively altering the display mode attribute of individual windows to render the interior of selected windows temporarily transparent. This process may be utilized repeatedly until such time as visually obscured data beneath a large number of overlapped applications may become visible.

Some systems maintain a list of open windows displayed through its own task list or window list. However, as more and more windows are opened even these lists become unmanagable and cumbersome. Use of such window lists is handicapped by lack of organization of the lists. Such organization as exists is derived by using a flat window list. Entries are alphabetized by window title, or listed in the order opened. Neither of these approaches necessarily groups windows by functional or logical relationship. In addition, conventional window lists are limited to supporting an action on one entry at a time. Simultaneous actions on groups of entries from window lists have not been enabled.

Logical organization of window lists of open windows and providing for simultaneous actions on groups of windows would clearly aid management by the user of a graphical user interface.

SUMMARY OF THE INVENTION

One object of the present invention is to provide for ease of use of a graphical user interface.

Another object of the present invention is to provide a method of logically organizing window lists in aid in manipulation and control of the windows.

In accordance with one embodiment of the present invention, a graphical user interface for a data processing system includes a method of accessing at least a first of a plurality of object owned windows simultaneously open in a graphic user interface on a computer system. For each objectc on a computer system, an object list is maintained. The object list includes all opened windows owned by the objects. User inputs to the computer system are monitored for a user request for a window list. Responsive to a user request for the window list, each object list is retrieved and, for object lists having a single opened window, a window entry to the window list is listed. For object lists having a plurality of opened windows, an object entry and a plurality of window entries are added to the window list. The window list is then displayed.

Window names include an owning object identifier and a description of the window. Adding a object entry and a plurality of window entries to a window list includes making the name of the object an entry and includes generating a plurality of entries for windows including descriptions of the windows. The window descriptions are placed proximate to but separate from the object name upon display of the window list.

BRIEF DESCRIPTION OF THE DRAWINGS

The foreground aspects and other features of the present invention are explained in the following written description, taken in connection with the accompanying drawings, wherein.

DETAILED DESCRIPTION OF THE INVENTION

The following detalied description is of the best presently contemplated mode for carrying out the invention. This description is not to be taken in a limiting sense but is made merely for the purpose of illustrating the general principles of the invention since the scope of the invention is best defined by the appending claims.

I. Operation Of The Computer System—User's Perspective

Figure 1:
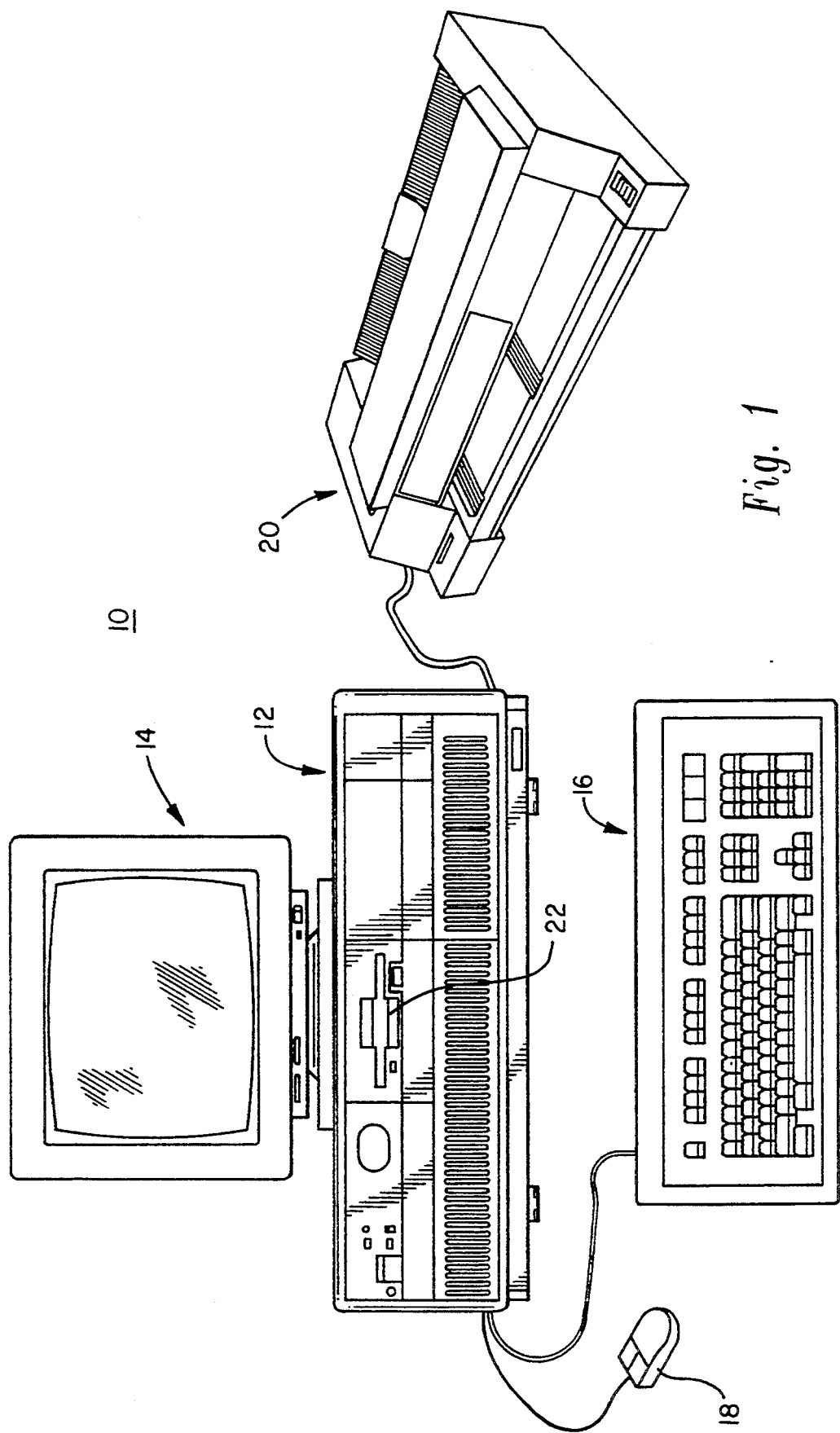
FIG. 1 shows a personal computer system in which the present invention can be employed.

Prior to relating the methodology and structure of the present invention, a summary of the operation in general of a typical personal computer system may merit review. Referring now to the drawings, and in particular to FIG. 1, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functoins as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area netowrk communication system are connected to the system unit 12 in a manner well known. Of course, those skilled in the art are aware that other conventional components can also be connected to the system unit 12 for interaction therewith. In accordance with the present invention, the computer system 10 includes a system process that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a BIOS interface between the I/O devices and the operating system. BIOS, which can be stored in a ROM on a motherboard or planar, includes diagnostic routines which are contained in a power on self test section referred to as POST.

II. Organization of the Computer System

Figure 2:
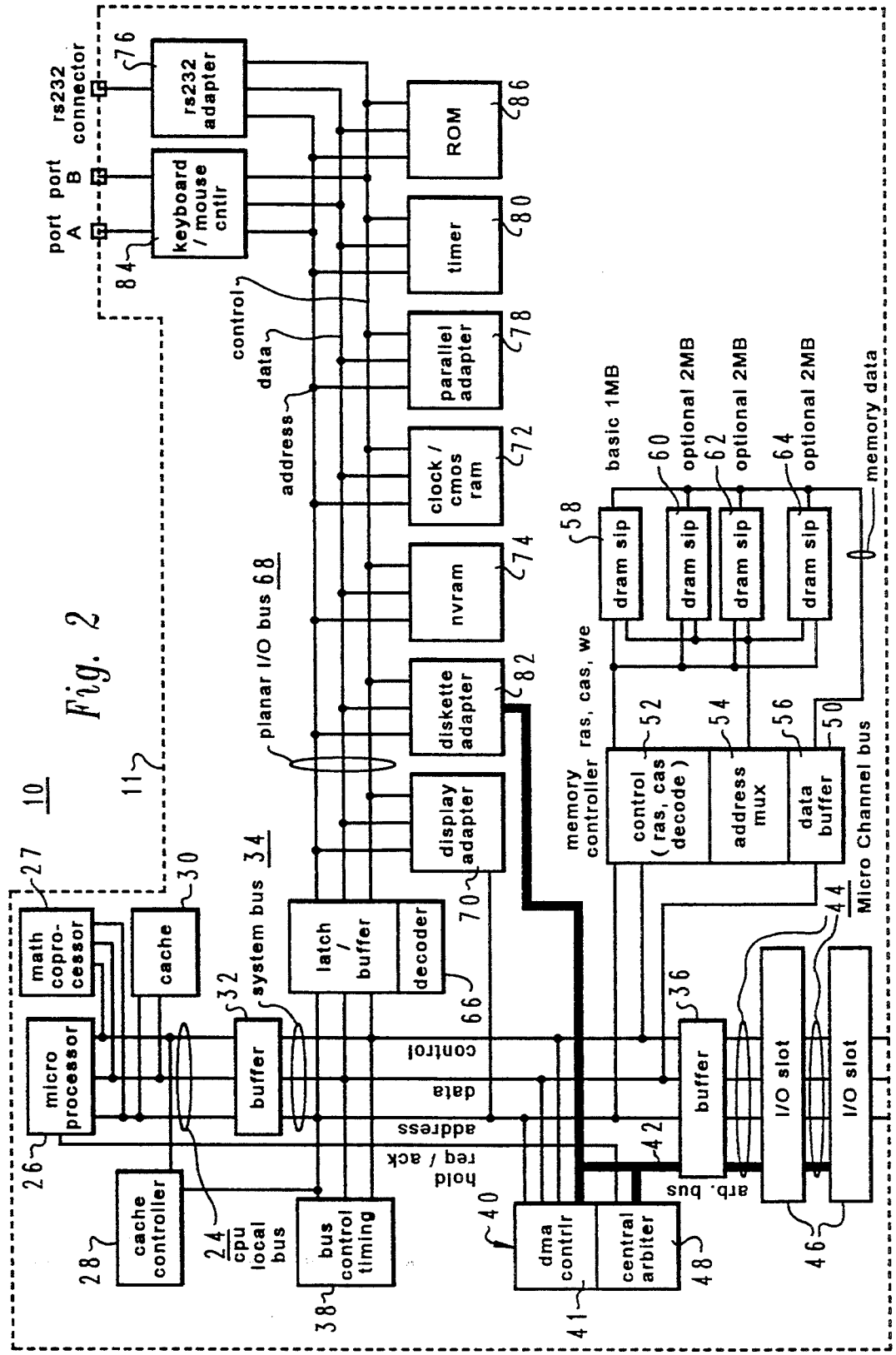
FIG. 2 shows a system block diagram for the personal computer system of FIG. 1.

Prior to relating the above structure to the present invention, a summary of the operation in general of the Personal Computer System 10 may merit review. Referring to FIG. 2, there is shown a block diagram of the Personal Computer System 10 illustrating the various components of the Computer System 10 in accordance with the present invention. FIG. 2 further illustrates components of the planar 11 and the connection of the planar 11 to the I/O slots 46 and other hardware of the Personal Computer System 10. Connected to the planar 11 is the system central processing unit (CPU) 26 comprised of a microprocessor which is connected by a high speed Central Processing Unit CPU local bus 24 through a bus controlled timing unit 38 to a memory control unit 50 which is further connected to a volatile random access memory (RAM) 58. While any appropriate microprocessor can be used for CPU 26, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be in Intel 80286 or 80486 microprocessor. There particular microprocessors can operate in a real addressing mode or a protected addressing mode. Each mode provides an addressing scheme for accessing different areas of the microprocessor's memory.

Returning now to FIG. 2, the CPU local bus 24 (comprising data, address and control components) provides for the connection of 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a Direct Memory Access (DMA) unit 40. The DMA unit 40 is comprised of a central arbitration unit 48 and a DMA controller 41. The buffer 36 provides an interface between the system bus 34 and an optional feature bus such as the Micro Channnl bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an addresss multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system of NVRAM which are saved when power is removed from the system.

Connected to keyboard/mouse controller 84 are ports A and B. These ports are used to connected a PC keyboard (as opposed to an ASCII terminal) and mouse to the PC system. Coupled to RS232 adapter unit 76 is an RS232 connector. An optional ASCII terminal can be coupled to the system through this connector.

III. OS/2 Version 2.0 Operating System—File System Architecture

The disk operating system (DOS) supplied with first generation IBM personal computers allocated space on a disk storage device through a file allocation table (FAT). Access to the FAT using a file name allows the computer to recover addresses for all sectors used to store a file. This association of a file name with sectors defines two attributes of a file, its name and address. The DOS directory structure allowed definition of further file attributes including, directory membership, creation or last revision date and size. The file allocation table and the directory structure are physically distinct from user files and are kept at fixed locations on a disk so that the computer need not look up an address to access file attributes.

DOS based graphical user interfaces, including the Microsoft Windows system, and the Presentation Manager for the IBM OS/2 operating system have ways to determine which data files are related to particular programs. Application programs were designed to supply extended attributes into association tables accessible to the operating system. These tables specify data file types cognizable by the program, a title for the data file types and an icon to represent the program in the GUI. The association table for a program would include a file name filter (i.e. a standard DOS file name extension to attach to user data files created using the program) and the icon. Extended attributes may be accessed, in an OS/2 operating environment, without opening a file. The present invention uses the information present in the association tables for such action oriented paradigm application to make the graphic user interface compatible with an object oriented paradigm.

Through extended attributes for an object, the OS/2 version 2.0 operating system allows an object to maintain a list of actions (i.e. applications) which can be performed on the object. This list is presented to a user in an object specific pop up menu. In the OS/2 operating system an object can be any passive entity that contains or receives data, for example, blocks, fields, files, directories, displays, keyboards, network nodes, pages and printers. Through the High Performance File System the name space for objects has also been substantially expanded. If the title of an object has a nonpermitted character for any file system, then an extended attribute is created.

IV. Display of Windows in a Graphical User Interface

Figure 3:
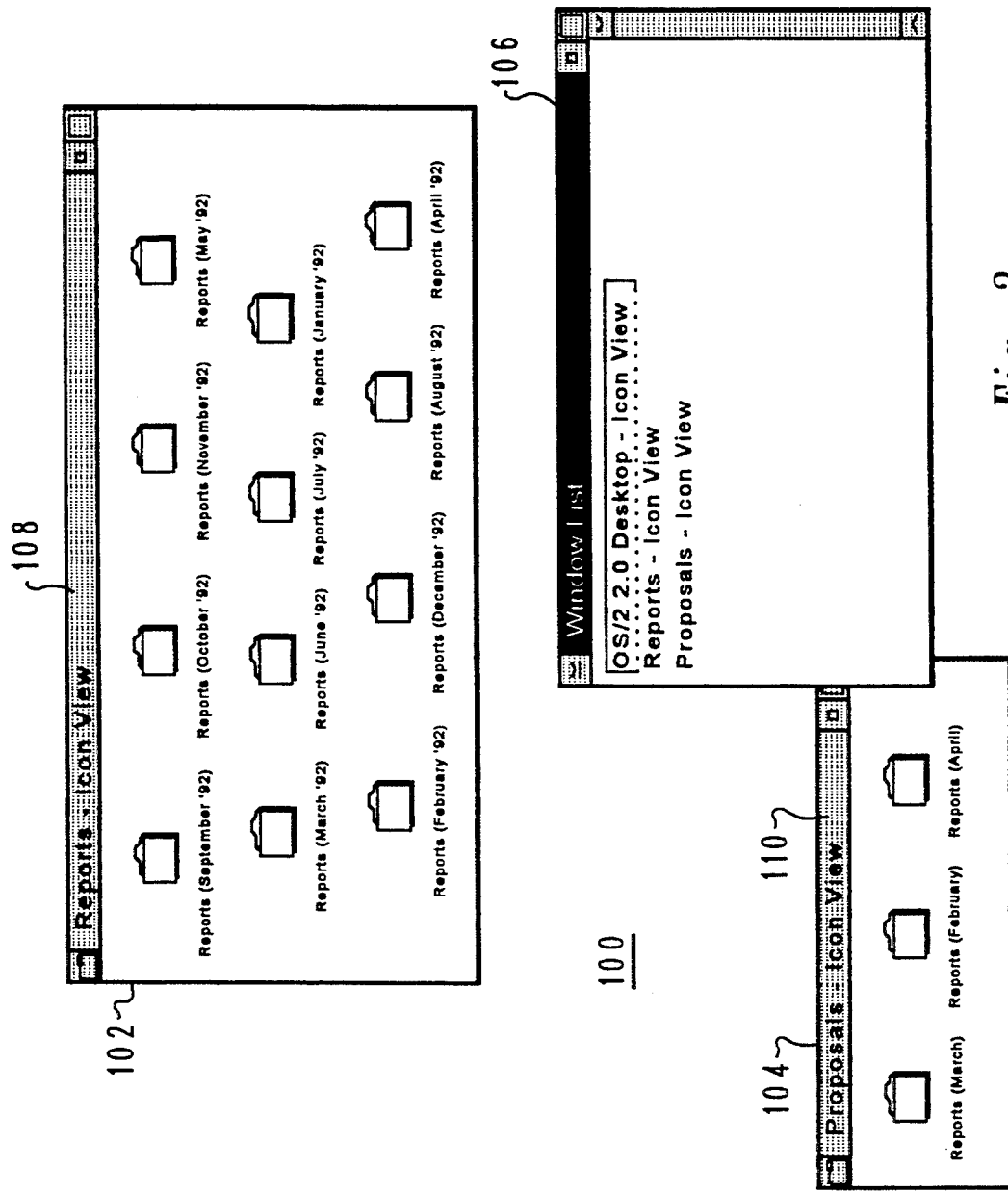
FIG. 3 is a screen representation into which a plurality of windows have been opened.

FIG. 3 illustrates a typical display screen 100 which appears when using theOS/2 version 2.0 operating system to generate an object oriented graphic user interface.

Upon display screen 100 three windows 102, 104 and 106 have been opened. Typically windows 102, 104 and 106 may be displayed in an overlapping sequence which is generally dependant upon the order in which the applications were opened or called. As illustrated, window 106 overlaps and partially obscures window 104. An open window represents a data file or a folder of data files. Here windows 102 and 104 represent folders of documents which are represented in iconic form. Window 106 is a window list of open views, excluding itself, but including an underlying desktop metaphor which the folders have been opened.

From window 106 it can be seen that the windows, excluding the window list 106 itself, have two-part names. For example, window 102 has in its title bar 108, the name "Reports-Icon View." In title bar 110 of window 104 is the title "Proposals-Icon View." Names of windows are always in the form of "Object Name-Window Description." As described in greater detail below, the method of the present invention maintains individual lists of opened windows on the basis of ownership by an object. This approach is consistent with an object oriented graphic user interface wherein objects (e.g. documents or user data files) are represented rather than applications (e.g. word processing programs). Window list 106 itself is a special case, which is always open but only visible upon specific request by a user and is hidden whenever it loses focus. As previously stated, it is not listed within the window list.

Figure 4:
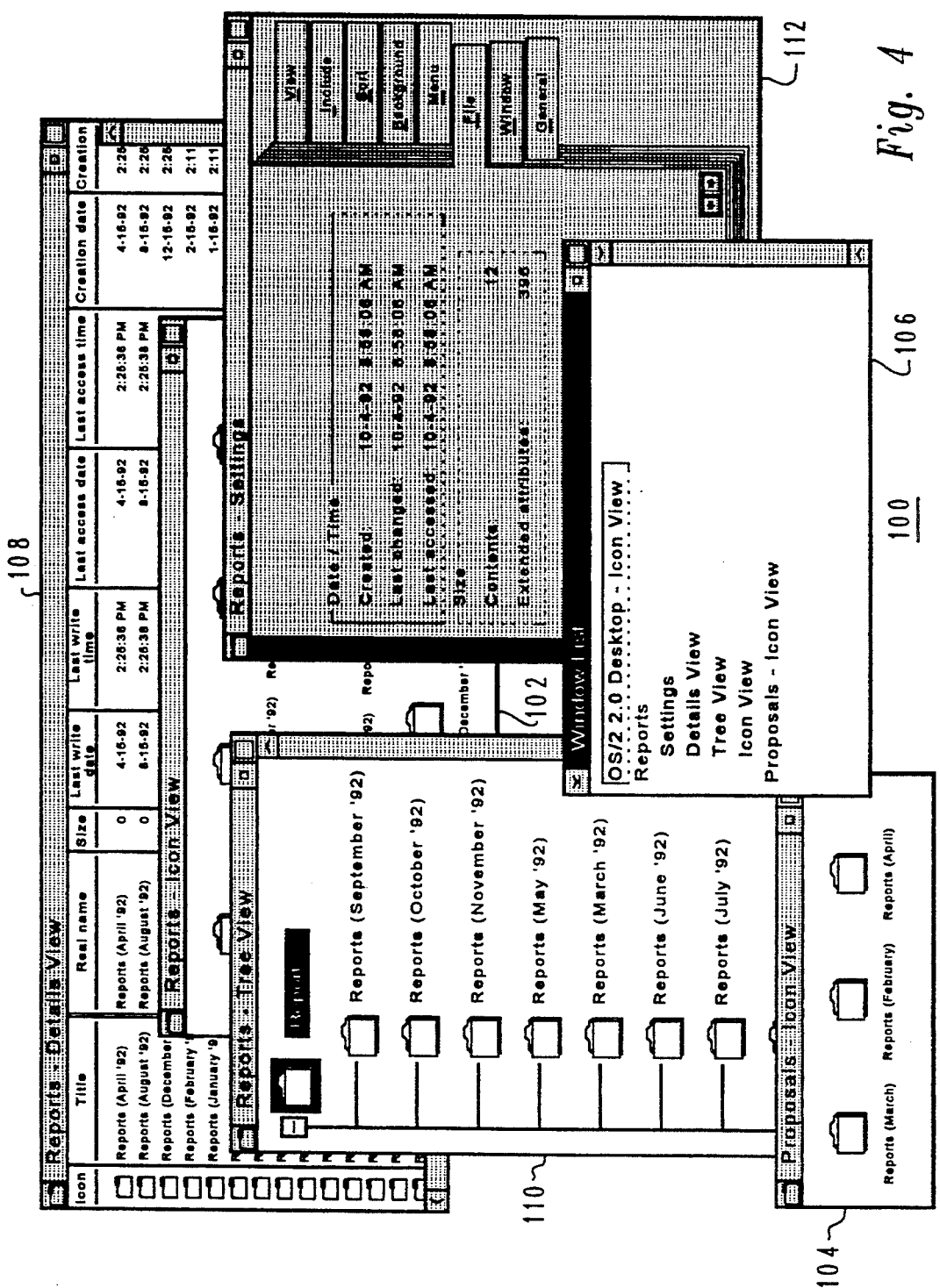
FIG. 4 is a screen representation into which still more windows have been opened over those of FIG. 3, including a window list as provided by the present invention.

In FIG. 4 a user has opened additional windows 108, 110 and 112 onto display screen 100. Previously, a folder object entitled "reports" had only one open window which was "Reports-Icon View" or window 102. Now window 108 entitled "Reports-Detail View", window 110 entitle "Reports-Tree View" and window 112 entitle "Reports-Settings" have been opened. Since windows 102, 108, 110 and 112 are owned by the same folder object, they are listed hierarchically in the window list 106 under the title of their owning object. Clutter is reduced by reducing the complexity of titles listed in window list 106.

Figure 5:
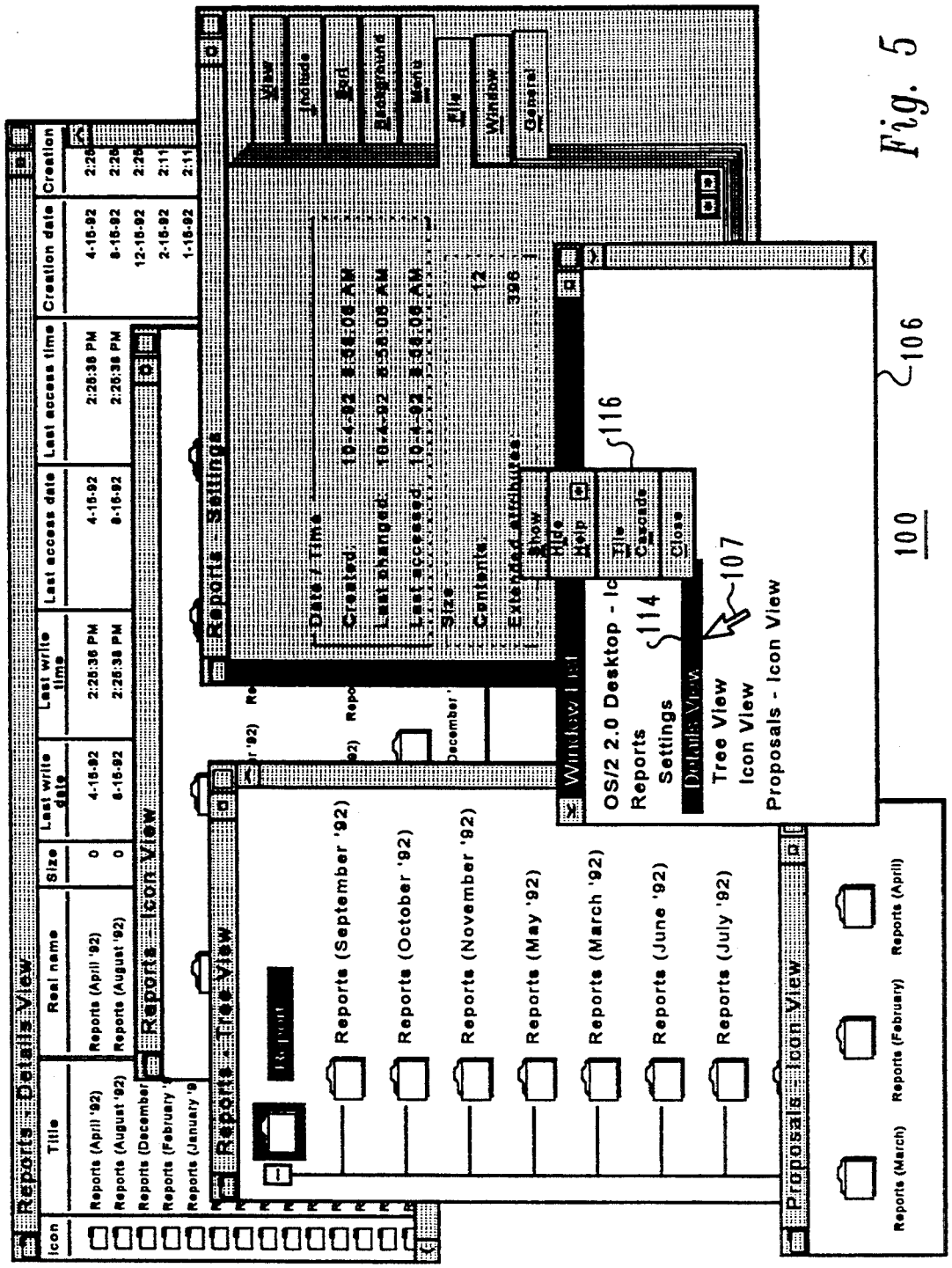
FIG. 5 is a screen representation of a plurality of windows and a window list with an attendant pop up menu for selecting an action on one of the opened windows.

FIG. 5 illustrates how invocation of an action on a single window from a window list 106 is presented to a user. A cursor 107 is moved to the area of the title of the window and the entry is selected. As illustrated, cursor 107 has been moved to the area of title 114 which has now been highlighted to indicate selection. A pop up menu 116 of possible actions is then displayed for entry 114. An action can then be selected by moving cursor 107 to the desired action and selecting the action. Those skilled in the art will realize that conventionally a mouse used to implement direct manipulation techniques for this purpose.

Figure 6:
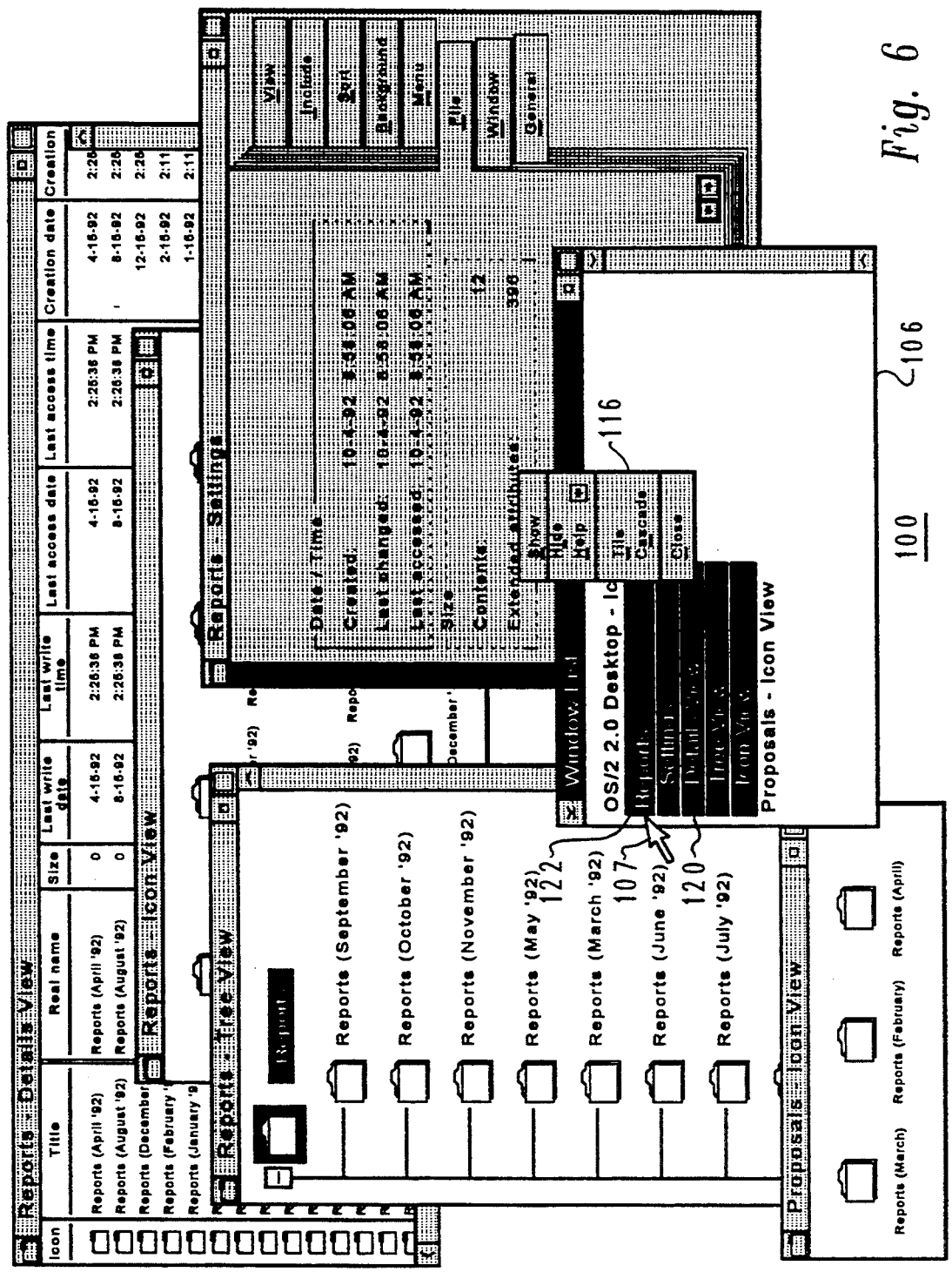
FIG. 6 is a screen representation of a plurality of windows and an opened window list used for selection of a plurality of opened windows for an operation.

FIG. 6 illustrates another selection mechanism provided by the present invention. Object title entry 122 has been selected by a movement of cursor 107 to the area of the title "Reports" and "double clicking" on the mouse that location. All of the indented window entries under reports are then selected as a group 120. When a pop up menu 116 is displayed, a selected action may be chosen which will apply to all of the windows of group 120. This provides a convenient way to close or hide all windows relating to a particular object or task. In an alternative, windows outside of a group may be selected individually for addition to group 120.

Figure 7:
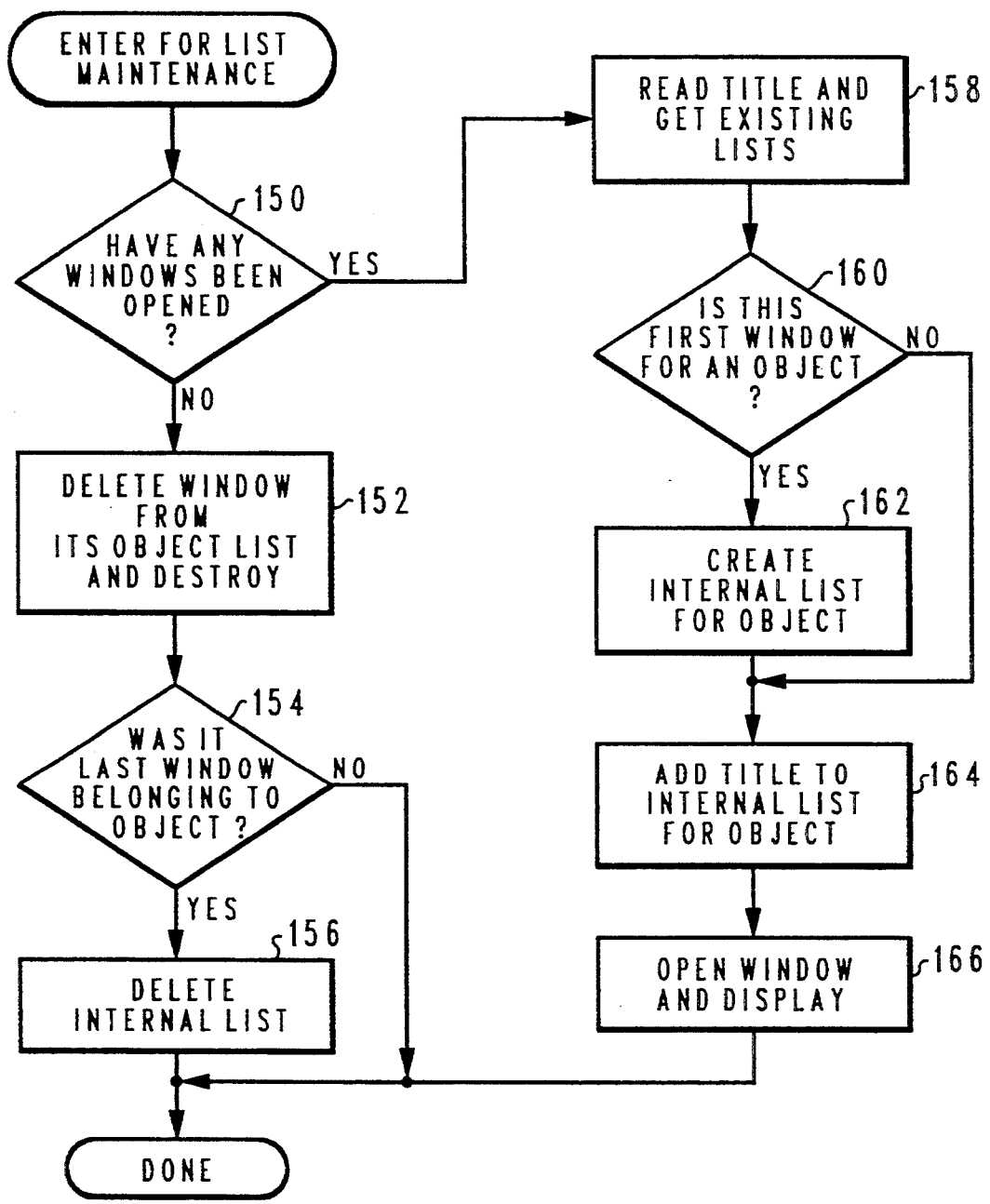
FIG. 7 is logical flow chart illustrating a process for maintaining the window list in accordance with the method of the invention.

FIG. 7 illustrates a process for maintenance of a window list. Entries from the window list must be removed or added with closing and opening of windows. The window list itself is always present if the graphic user interface of the computer system is in use. In other words, if windows are being used, a desktop metaphor will be displayed on screen 100 and this metaphor will provide one entry for the window list. The windows list disappears only if the graphic user interface is exited in favor of a command line interface. The process for list maintenance is entered at step 150 where it is determined if a window has been opened. If not, the process was entered because a window has been closed and the NO branch is followed to step 152. In step 152 the window is closed and deleted from its object list. As previously mentioned, individual windows are organized by owning objects. Accordingly, at step 154, it is determined if the window just closed was the last that belonged to an object. If it was, the YES branch is followed to step 156 and the object's internal list is deleted. If a window was not the last window belonging to an object step 156 is skipped. List maintenance processing is then exited.

List maintenance processing is also done upon opening of a window. Returning to step 150 and following the YES branch to step 158, the title of a newly opened window is read and existing object lists are retrieved. At step 160 a comparison is done between the name of the newly opened window and names of the owning objects of the internal object lists. If the newly opened window is the first window for an object (i.e. no match occurs) the YES branch is followed to step 162 to create an internal object list for the object. Subsequent to creation of this list, or subsequent to determination that the window was not the first for an object, step 164 is executed to add the title to the internal object list for its owning object. If a window is the first for an internal object list, the list has only one entry, which is identified by both the object name and the view description. If a window is not first, the list has entries equaling the number of open windows plus one. The first item is the object. Subsequent items are view descriptions. Next, step 166 is executed to open the window and display it. Processing is completed and list maintenance is exited.

Figure 8:
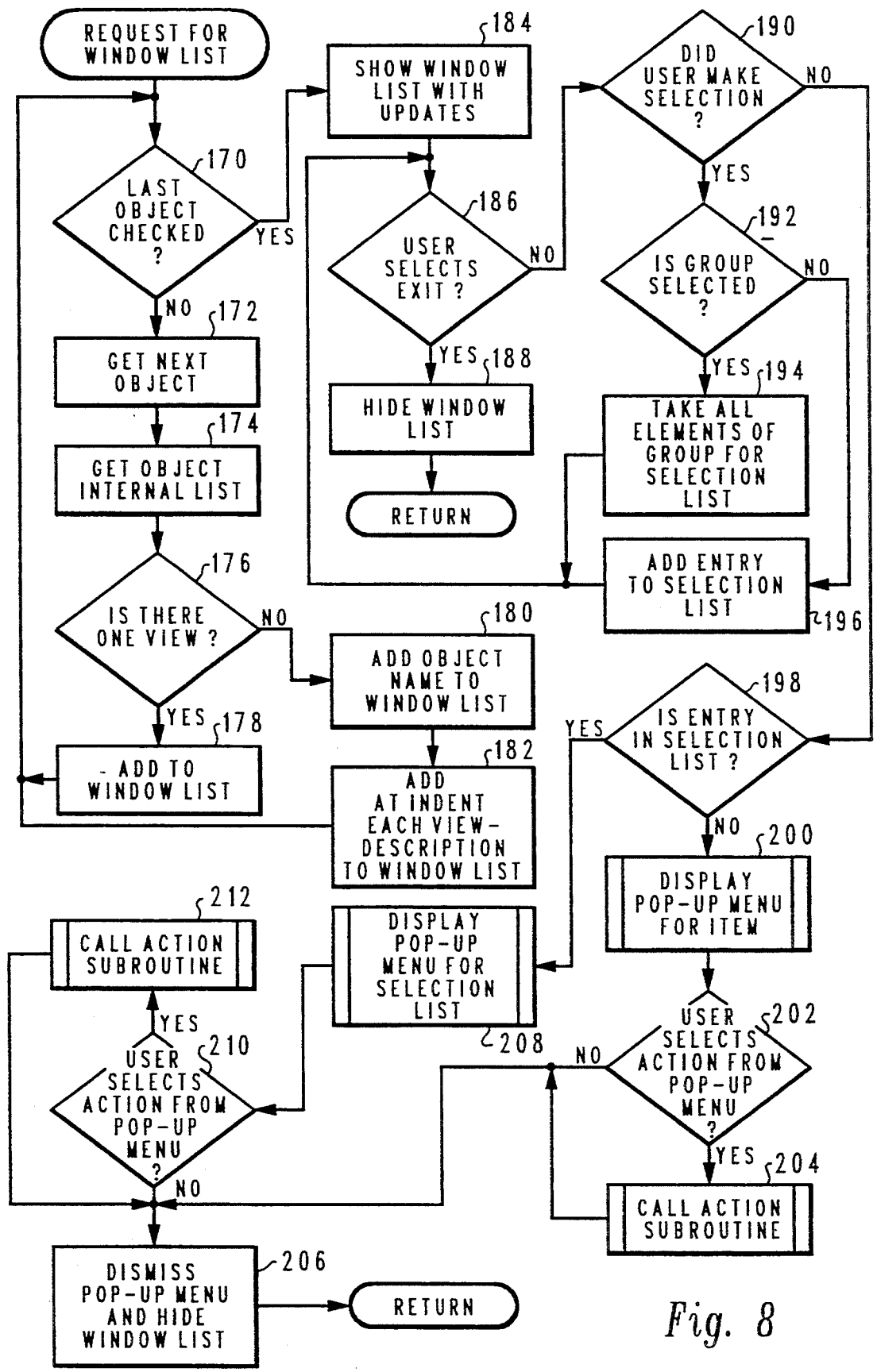
FIG. 8 is a logical flow chart for a process for generating a window list upon user request.

FIG. 8 is a logical flow chart illustrating a process executed by a data processing system upon user request for display of a window list. The process is entered at step 170 where it is determined if the last object with opened windows has been checked. If not, step 172 is executed to get the next object. At step 174 the internal list for that object is retrieved. Next at step 176 it is determined if there is one view or window item entry in the list. If yes, step 178 is executed to add the object and window title to the display list and processing is returned to step 170. If an object owns more than one opened window, the NO branch from step 176 is followed to step 180. At step 180 the object name is added to the window list. Next, at step 182, each view description, i.e. the portion of the title following the hypen, is added to the window list on lines just below the object name. Each window description is indented from the object name. Processing is then returned to step 170 to determine if another object list requires processing. Subsequent to inspection of the last object the YES branch is followed from step 170 to step 184. In step 184 the window list is displayed as updated.

The user has a number of options at this point including exiting the window list or selecting operation on windows from the window list. Subsequent to step 184, step 186 occurs upon user selection of an option. Step 186 determins if a user has selected exiting from the window list. Following the YES branch from step 186 to step 188, processing causes the window list to be hidden and the process is then exited. If the user selects some other action, the NO branch is followed from step 186 to step 190. An initial user action can fall into one of two categories, those being a request for a pop up menu for an entry or group, or assignment of an entry or group to a selection list. The question is characterized in step 190 as whether the user made a selection, i.e. a request to add a group or entry to a selection list. The YES branch from step 190 to step 192 is used to determine if the selection was of a group or of an individual entry. As mentioned above, a group is selected by selection of an object title which has a plurality of intended window description titles following it. Step 194 follows from taking the YES branch from step 192. With execution of step 194, all elements of the group are taken for the selection list and processing is return to step 186. The NO branch from step 192 is followed if an individual entry has been selected. Step 196 then represents addition of that entry to the selection list. Again processing is returned to step 186.

At step 190, if it is determined that a user did not make a selection as defined above, a user request for a pop up menu has occurred. The NO branch is followed to step 198 where it is determined if the entry at the current location of the cursor is in a selection list. Pop up menus for windows represent actions that may be taken on all windows of a selection list, or actions that may be taken on a single window. Accordingly, the contents of a pop up menu are determined by context. One context is whether the entry is a member of a selection list and any action taken will have to be applied to a plurality of windows. When an entry is not on a selection list the NO branch from step 198 is followed to step 200 for display of a pop up menu for the item. Step 200 represents the subroutine which is called for generation of the pop up menu. Contextural matters handled in the subroutine include whether the window is partially obscured, hidden or visible, etc. After display of a pop up menu step 202 is executed to determine if a user has selected an action from the pop up menu. If the user has selected an action from the menu the YES branch is followed from step 202 to step 204 to call an action subroutine. After call of the action subroutine, the menu and window list are dismissed and hidden, respectively, as specified by step 206. If the user exited the pop up window without selection of an action, processing follows the NO branch from step 202 directly to step 206 for dismissal of the pop up menu and hiding the window list. Processing is then exited.

If at step 198 an entry is determined to be a member of a selection list, the YES branch is taken to step 208 to call the subroutine for display of a pop up menu for the selection list. The subroutine differs from that of the subroutine specified by step 200. After display of the pop up menu processing advances to step 210 where it is determined if a user has selected an action from the pop up menu. If not, processing can advance directly along the NO branch to step 206 for dismissal of the menu and hiding of the window list. If user has selected an action the YES branch is taken to step 212 to call the action subroutine for selection lists. Subsequent to processing of the action, execution is sent to step 206 for dismissal of the menu and hiding of the window list.

Figure 9:
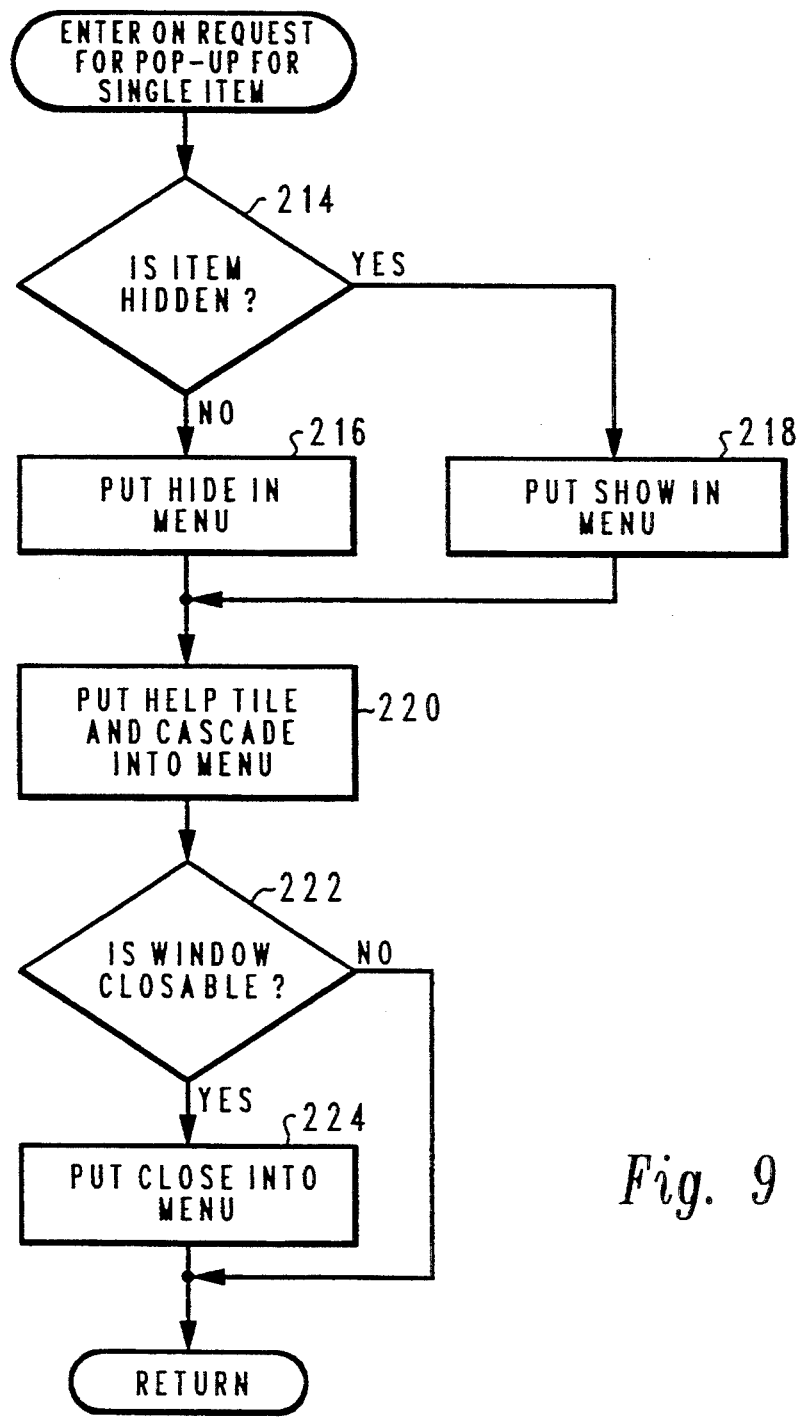
FIG. 9 is a logical flow chart for a process for generating a pop up menu of actions for a single entry in a window list.

FIG. 9 is a logical flow chart entered upon request for a pop up menu for a single window entry in a window list. The process corresponds to block 200 of FIG. 8. The process is entered at step 214 where it is determined if the window corresponding to the entry is partially or fully hidden. If the window is not hidden the option of hiding the window is added to a list for the pop up menu in step 216. If the window is hidden the option of showing the window represented by the entry is put into the menu at step 218. Following either step 216, or step 218, is step 220. The menu options of "help", "title" and "cascade" are added to the pop up menu at step 220. The help option results in generation of a pop up window, the contents of which will be defined by an application programmer. Tile and cascade options at first blush would appear to have little relevance to a single window. Tiling refers to taking a group of entries, dividing the available space in a screen among them, and placing the windows at each location sized to correspond to the location so that the windows do not overlap one another. The cascade option orders a group of windows and makes each window correspond to a standardized size. Beginning from a defined location of the display screen the windows are written one after another in order determined by the window list. The last window in the cascaded window list will be fully displayed and will overlap the processing window. The title bar of each preceding window will be visible above the overlapping windows. Selection of the tile option for a single window simply results in the window being sized to fill the whole screen. Selection of the cascade option for a single window results in that window being painted to the appropriate standardized size and positioned in the available display screen at the beginning position for a cascade. Subsequent to step 220, step 222 is executed. At step 222 it is determined if closure of the window is permitted. If yes, step 224 is executed to put the close option into the menu. If a window is not closable the NO branch is taken around step 224. The processing is then returned to the logical flow chart of FIG. 8.

Figure 10:
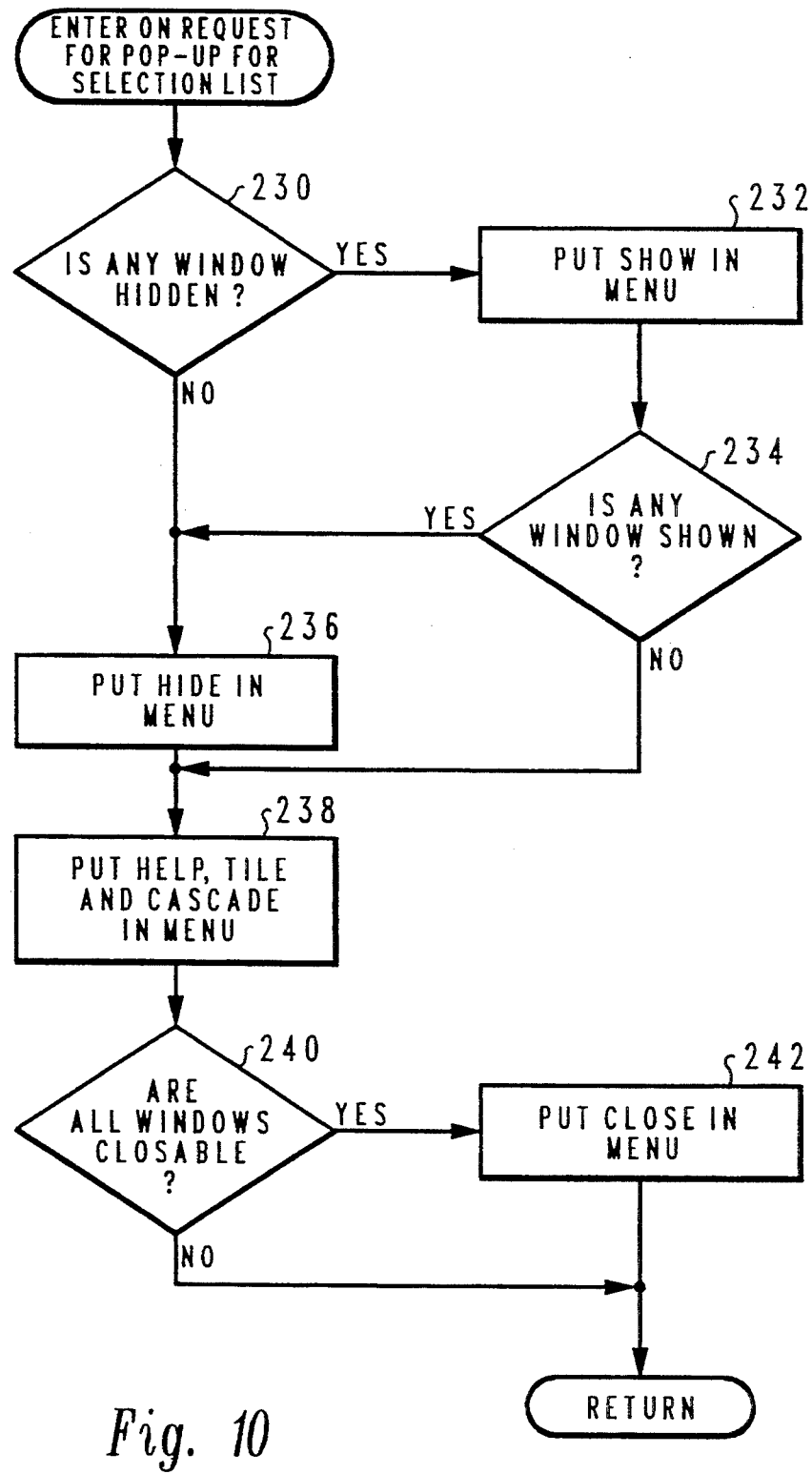
FIG. 10 is a logical flow chart for a process for generating a pop up menu of action for a group of entries in a window list.

FIG. 10 is a logical flow chart illustrating the subroutine corresponding to block 208 in FIG. 8. The process is entered upon request for a pop up menu for a selection list. The process is entered with execution of step 230 where it is determined if any window in the selection list is hidden. If yes, processing is directed to step 232 to add the option of show to the pop up menu. Next, it is determined at step 234 if any window is shown. If yes, processing is advanced to step 236 to add "hide" as an option within the menu. Step 236 occurs following the NO branch from step 230. Subsequent to step 236, or step 234, following the NO branch, step 238 is executed to put help, tile and cascade into the pop up menu. These options were described above in connection with FIG. 9. Step 240 is then executed to determine if all windows in a selection list are closable. If they are all closable, the YES branch is followed to step 242 to put the close option into the menu. Otherwise the NO branch is taken to return processing to the appropriate location of FIG. 8. Similarly processing is returned to FIG. 8 subsequent to execution of step 242.

Figure 11:
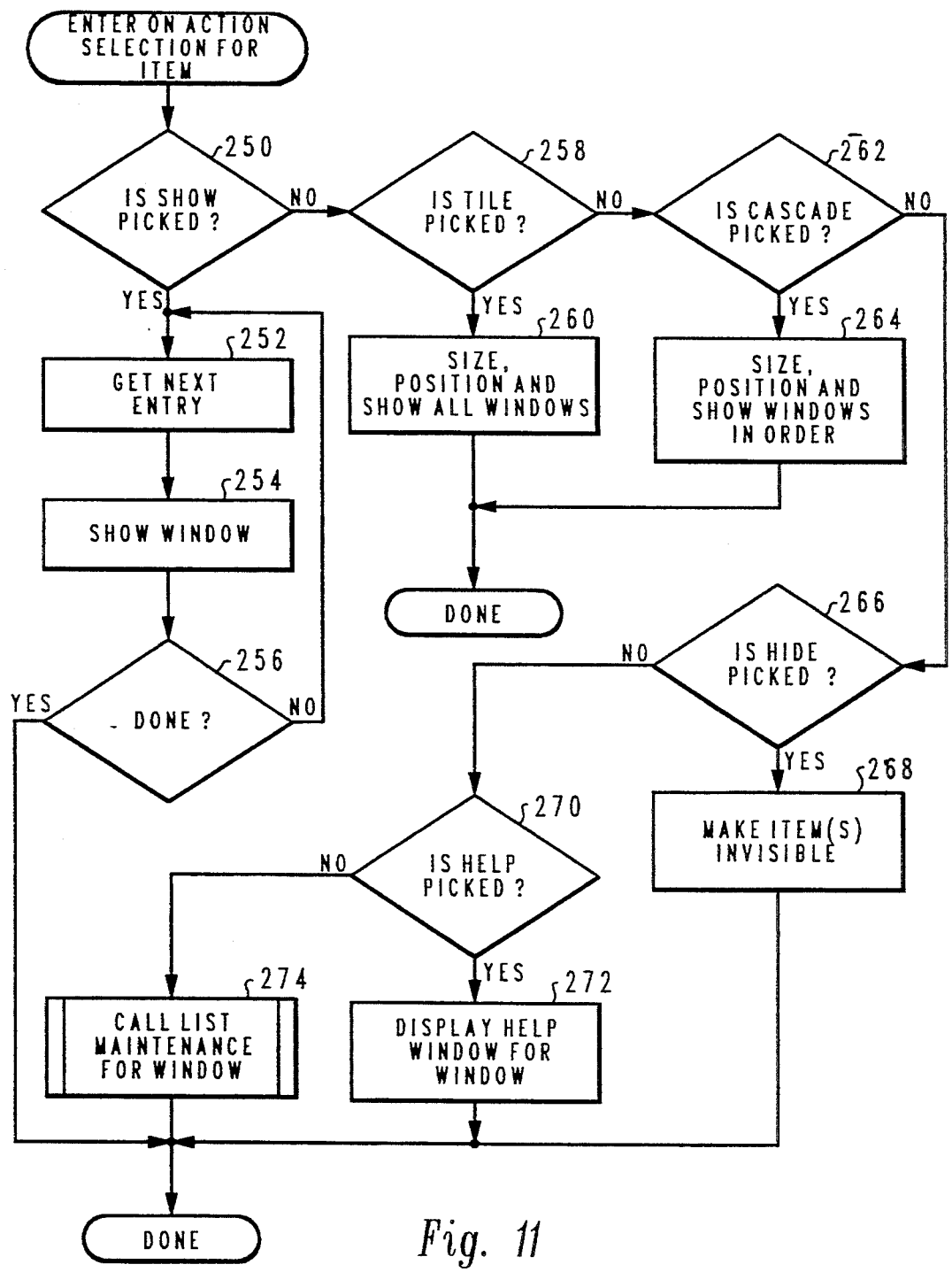
FIG. 11 is a logical flow chart for handling an action upon selection from a pop up menu.

FIG. 11 is a logical flow chart for response to selection of an action from a pop up menu. The process is entered with execution of step 250 where it is determined if the user has selected the option "show." If yes, step 252 is executed to get the next entry from the selection list, or to recover the single entry for which the action was selected. At step 254 the window for the retrieved entry is shown. Next, in step 256, it is determined if display of windows is completed. If the show option has been selected for a plurality of windows in a selection list, it is possible that windows further down the list in order will obscure those displayed first. If all objects have not been done, processing is returned from step 256 along the NO branch to step 252 to retrieve the next entry. If processing is completed, the YES branch is followed to exit the subroutine.

Along the NO branch from step 250, followed when some action other than show has been picked, step 258 is executed to determine if the selection was tiling. If yes, step 260 is executed to size, position and show all windows as described above. The subroutine is then exited.

The NO branch from step 258 advances processing to step 262 where it is determined if the cascade option was selected. If yes, step 264 follows to size, position and show windows in their order from the window list. Again only those windows on the selection list, or an individual entry, are acted on, although unselected windows may be obscured as a result. Processing is then exited.

The NO branch from step 262 advances processing to step 266 where it is determined if the hide option has been selected. If yes, step 268 is executed to make the item invisible and the subroutine is exited. If no, processing is advanced to step 270 where it is determined if the help option has been picked. If yes, step 272 is executed to display a help window for each window in the selection list or for the individual entry. The subroutine is then exited.

The NO branch from step 270 indicates that the close option was selected from the pop up menu. Processing is advanced to step 274 to call the list maintenance procedure for all windows represented in the selection list. Upon return from "list maintenance" the subroutine is exited.

The present invention provides a mechanism to generate a window list exhibiting logical organization for facilitation of navigation through windows. Related windows are grouped by owning object in conformance with an object oriented graphic user interface. Actions may be selected on an individual window, upon entire groups, or upon selected entries from a window list. Groupings of related windows are made visually distinct to improve accessibility.

While the invention has been particularly shown and described with reference to a preferred embodiment, it will be understood by those skilled in the art that various changes in form and detail may be made therein without departing from the spirit and scope of the invention.

What is claimed is:

1. A method of enhancing the efficiency of user manipulation of a plurality of object owned windows which are simultaneously open in a graphic user interface on a computer system, the method comprising the steps of:
   maintaining for each of a plurality of objects, an object list of opened windows owned by each object;
   monitoring user inputs to the computer system for a user request for a window list;
   responsive to suer request for the window list, retrieving each object list and, for object lists having a single opened window, adding a window entry to the window list and for object lists having a plurality of opened windows, adding an object entry and a plurality of window entries to the window list each entry in the window list including a title identifying each object or owning object and a description;
   displaying the window list such that a user may select an entry therefrom;
   responsive to user selection of an object title entry, assigning all opened windows belonging to the object to a selection list;
   responsive to user selection of an entry including a window description, assigning the associated open window to the selection list; and
   thereafter, displaying a menu of permitted actions for all entries in the selection list wherein user manipulation of said plurality of object ownded windows is enhanced.

2. A method as set forth in claim 1, wherein the step of retrieving each object list and, for object lists having a plurality of opened windows, adding an object entry and a plurality of window entries to the window list further includes listing the opened windows after the object and indenting the descriptions of the opened windows from the objects.

3. A computer system for enhancing the efficiency of user manipulation of a plurality of object owned windows which are simultaneously open in a graphic user interface on the computer system, comprising:

an object list of opened windows owned by each object in the data processing system;

means for monitoring user inputs to the computer system for a user request for a window list;

means responsive to user request for the window list for retrieving each object list and, for object lists having a single opened window, adding a window entry to the window list and for object lists having a plurality of opened windows, adding an object entry and a plurality of window entries to the window list, each entry in the window list including a title identifying each object or owning object and a description;

means responsive to user selection of an object title entry, assigning all opened windows belonging to the object to a selection list;

means responsive to user selection of an entry including a window description, assigning the associated open window to the selection list; and means for thereafter, displaying a menu of permitted actions for all entries in the selection list wherein user manipulation of said plurality of object owned windows is enhanced.

4. A computer system as set forth in claim 3, wherein the means for retrieving each object list and, for object lists having a plurality of opened windows, the means for adding an object entry and a plurality of window entries to the window list further includes listing the opened windows after the object and indenting the descriptions of the opened windows from the objects.

* * * * *

UNITED STATES PATENT AND TRADEMARK OFFICE
CERTIFICATE OF CORRECTION

PATENT NO. : 5,412,776
DATED : May 2, 1995
INVENTOR(S) : Marc A. Bloomfield, et al It is certified that error appears in the above-indentified patent and that said Letters Patent is hereby corrected as shown below:

--Column 3, line 50-- change "objectc" to
--object--

--Column 4, line 65-- change "functoins" to
--functions--

--Column 5, line 8-- change "netowrk" to
--network--

--Column 6, line 8-- change "Channl" to
--Channel--

--Column 6, line 58-- change "connected" to
--connect--

--Column 7, line 44-- change "theOS/2" to
--the OS/2--

--Column 8, line 13-- change "entitle" to
--entitled--

--Column 8, line 28-- change 2nd "the" to
--that--

UNITED STATES PATENT AND TRADEMARK OFFICE
CERTIFICATE OF CORRECTION

PATENT NO. : 5,412,776
DATED : May 2, 1995
INVENTOR(S) : Marc A. Bloomfield, et al It is certified that error appears in the above-indentified patent and that said Letters Patent is hereby corrected as shown below:

--Column 9, line 34-- change "hypen" to
--hyphen--

--Column 9, line 43-- change "operation" to
--operations--

--Column 9, line 46-- change "determins" to
--determines--

--Column 10, line 15-- change "the" to
--a--

--Column 10, line 16-- change "Contextural" to
--Contextual--

--Column 10, line 55-- change "title" to
--tile--

--Column 11, line 2-- change "processing" to
--proceeding--

UNITED STATES PATENT AND TRADEMARK OFFICE
CERTIFICATE OF CORRECTION

PATENT NO. : 5,412,776
DATED : May 2, 1995
INVENTOR(S) : Marc A. Bloomfield, et al It is certified that error appears in the above-indentified patent and that said Letters Patent is hereby corrected as shown below:

--Column 12, line 41-- change "suer" to
 --user--

--Column 12, line 60-- change "ownded" to
 --owned--

Signed and Sealed this

Twelfth Day of December, 1995

Attest:

BRUCE LEHMAN

*Attesting Officer*    *Commissioner of Patents and Trademarks*